June 7, 1949.  H. D. DUFAULT  2,472,198
COMBINED COOKING AND AIR HEATING STOVE
Filed Dec. 4, 1944

INVENTOR.
Homer D. Dufault.
BY Walter C. Ross.
Attorney.

Patented June 7, 1949

2,472,198

UNITED STATES PATENT OFFICE 2,472,198

COMBINED COOKING AND AIR HEATING STOVE

Homer D. Dufault, Easthampton, Mass., assignor to Heatbath Corporation, Springfield, Mass., a corporation of Massachusetts Application December 4, 1944, Serial No. 566,545

2 Claims. (Cl. 126—6)

1

This invention relates to improvements in heating apparatus and is directed particularly to heating apparatus which is particularly adapted to be placed in the compartment of a household range or the like.

The principal objects of the invention are directed to the provision of heating apparatus which by reason of its novel construction and arrangement may be placed in a heating compartment of a domestic range.

Gas ranges such as are commonly in use are primarily for cooking purposes and are not usually intended for heating. However, these ranges usually have a compartment which may be utilized to enclose a heater for heating purposes.

The heating apparatus of the invention is simple in form so as to be economical to manufacture while efficient in operation and may be readily installed in a range or other casing.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 2:
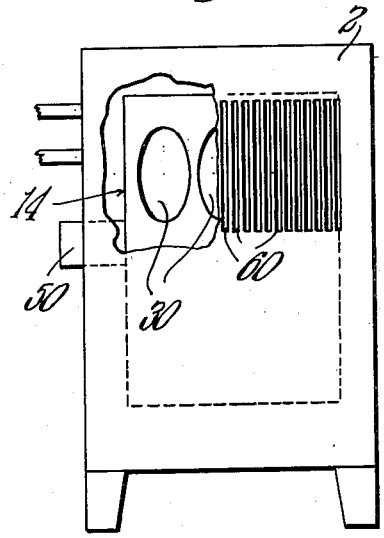
Fig. 2 is a side elevational view of the cabinet shown in Fig. 1.

Referring now to the drawings more in detail, the invention will be fully described.

Figure 1:
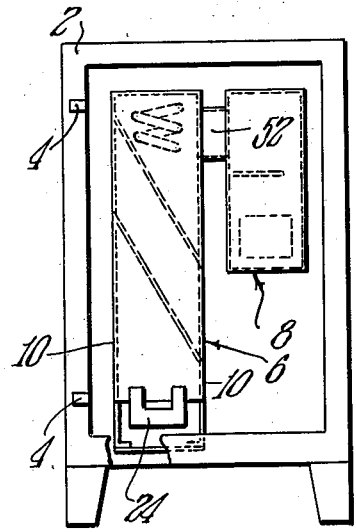
Fig. 1 is a front elevational view of a cabinet having the heater of the invention associated therewith.

A cabinet is represented at 2 in which the heating apparatus of the invention is disposed. It will be readily understood that the heating apparatus of the invention may be located in any other form of cabinet or in the compartment of a range or the like. In Fig. 1 the cabinet has an open front side and normally there would be a door to close said opening which could be mounted in some well known manner for swinging movements on hinges indicated at 4.

The heating apparatus of the invention includes separate primary and secondary compartments 6 and 8 which may be made from sheet metal with the components thereof welded or otherwise suitably secured all as may be desired.

2

The primary compartment has side walls 10, front and rear walls 12 and 14, and upper and lower walls 16 and 18. A transverse member 20 is provided in the cabinet and the heating apparatus is supported therefrom as by brackets 22 or in some other suitable manner.

A burner construction is represented by 24 and the lower wall 18 of the compartment 6 is provided with a slot 26 above said burner 24. Extending diagonally through the compartment 6 are a plurality of tubes 30 which have opposite ends secured to the side walls 10. These provide air passages which extend through the compartment that are separate from the interior of said compartment 6 which may be termed a combustion chamber. The secondary compartment includes side walls 40, front and rear walls 42 and 44 and upper and lower walls 46 and 48. A flue 50 extends from the rear wall of the secondary compartment 44 and one or more connections 52 connect the compartments 6 and 8 at their upper sides. A baffle 54 intermediate the upper and lower walls of the secondary compartment is provided so as to form a restricted space between the end thereof and an adjacent wall 40. The casing 2 will be open more or less at its lower side to facilitate a supply of air to be heated and the member 20 will be preferably located beneath the burner 24 in order to baffle reflected heat from burner.

Figure 4:
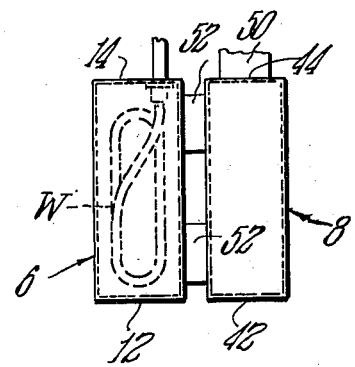
Fig. 4 is a plan view of a heating apparatus of the invention.
Figure 3:
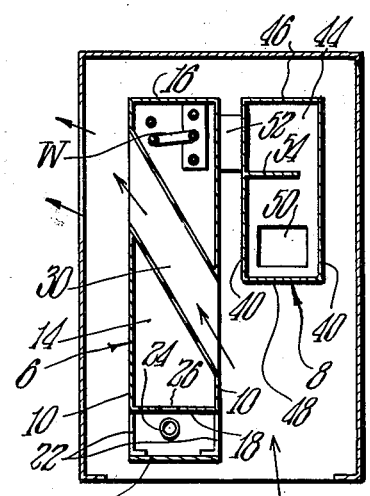
Fig. 3 is a vertical sectional view through the apparatus shown in Figs. 1 and 2.

There may be outlets in the casing 2 for heated air. In the form of the invention shown, there are a plurality of outlets 60 in the side of the casing 2 adjacent the upper ends of the tubes 30. A water coil W may be disposed in the upper portion of the chamber 14 as shown in Figs. 3 and 4 and said coil as is usual may be connected to a hot water supply system.

In operation gas or the like from the burner 24 passes upwardly into the primary compartment where combustion takes place. The gases pass upwardly past and around the tubes 30 for heating the same and also to heat the walls of the primary compartment 6. From the compartment 6 the gases pass through the connections 52 into the secondary compartment 8 and downwardly past the baffle 54 and out the flue 50 and thereby the walls of the secondary compartment are heated.

Air enters the casing 2 at the lower side thereof and flows upwardly so as to wipe the walls of the compartments whereby it is heated. Due to the arrangement and disposition of the tubes 30 air passes therethrough. Air which is heated by the walls and tubes passes outwardly through the openings 60 or any other openings which may be provided. It will be observed that the heating apparatus is adapted for broad application and may be installed in various casings or ranges. It will be noted that the heating apparatus is compact in form and simple in construction so as to be readily installed when desired while at the same time it is constructed for efficiency and economy in operation.

There may be upwardly extending parts of the wall 18 at opposite sides of slot 26 so that burner tube is out of the combustion chamber while sufficient secondary air is admitted for the gas from the burner.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The combination with a range having a compartment having a flue for gases and a warm air outlet in adjacent walls thereof of a heater in said compartment comprising in combination, separate horizontally spaced primary and secondary heater compartments in the compartment of the range and spaced from the walls thereof, said heater compartments including upper and lower horizontal walls and vertical inner and outer side walls and end walls, hollow pipe connections between inner adjacent side walls of said heater compartments at upper portions thereof adjacent said end walls, the lower wall of said primary compartment provided with a longitudinal slot for a burner, the lower wall of the secondary compartment being disposed in a plane intermediate the planes of the upper and lower walls of the primary compartment, air tubes extending diagonally upwardly through said primary compartment from the inner wall to outer wall thereof having opposite ends secured to said walls, the ends of said tubes secured to the inner walls of the primary compartment disposed below the plane of the lower wall of the second compartment, the ends of said tubes secured to the outer wall of the primary compartment disposed adjacent the outlet of the range compartment, and a hollow flue connection extending from the lower portion of one end wall of the secondary compartment.

2. The combination with a range having a compartment having a flue for gases and a warm air outlet in adjacent walls thereof of a heater in said compartment comprising in combination, separate horizontally spaced primary and secondary heater compartments in the compartment of the range and spaced from the walls thereof, said heater compartments including upper and lower horizontal walls and vertical inner and outer side walls and end walls, hollow pipe connections between inner adjacent side walls of said heater compartments at upper portions thereof adjacent said end walls, the lower wall of said primary compartment provided with a longitudinal slot for a burner, the lower wall of the secondary compartment being disposed in a plane intermediate the planes of the upper and lower walls of the primary compartment, air tubes extending diagonally upwardly through said primary compartment from the inner wall to outer wall thereof having opposite ends secured to said walls, the ends of said tubes secured to the inner wall of the primary compartment disposed below the plane of the lower wall of the secondary compartment, the ends of said tubes secured to the outer wall of the primary compartment disposed adjacent the outlet of the range compartment, and a hollow flue connection extending from the lower portion of one end wall of the secondary compartment, and a baffle in said secondary compartment between said hollow pipe connections and flue connection and extending between the ends of said compartment and from one side wall and terminating at a distance from the other side wall thereof.

HOMER D. DUFAULT.

REFERENCES CITED

The following references are of record in the file of this patent:

UNITED STATES PATENTS

| Number | Name | Date |
|---|---|---|
| 486,990 | Tallmage | Nov. 29, 1892 |
| 1,208,300 | Depolo | Dec. 12, 1916 |
| 1,830,008 | Tuck | Nov. 3, 1931 |
| 1,850,466 | Martin | Mar. 22, 1932 |
| 1,918,617 | Smith | July 18, 1933 |
| 1,931,959 | Holmes | Oct. 24, 1933 |
| 1,944,488 | Bertossa | Jan. 23, 1934 |
| 2,096,194 | Myers | Oct. 19, 1937 |
| 2,159,156 | Honer | May 23, 1939 |
| 2,221,647 | Mooney | Nov. 12, 1940 |
| 2,283,407 | Basset et al. | May 19, 1942 |